United States Patent [19]

Penczynski et al.

[11] 3,959,576
[45] May 25, 1976

[54] APPARATUS FOR SUPPLYING POWER TO ELECTRICAL DEVICES HAVING CONDUCTORS COOLED TO A LOW TEMPERATURE

[75] Inventors: Peter Penczynski; Fritz Schmidt, both of Erlangen, Germany

[73] Assignee: Siemens Aktiengesellschaft, Munich, Germany

[22] Filed: Feb. 25, 1975

[21] Appl. No.: 553,148

[30] Foreign Application Priority Data
Mar. 1, 1974  Germany............................ 2409868

[52] U.S. Cl. .......................... 174/15 BH; 174/15 S
[51] Int. Cl.² .................. H01B 7/34; H01L 39/00; H01B 12/00
[58] Field of Search............ 174/15 R, 15 C, 15 BH, 174/16 BH, DIG. 6; 165/105; 62/514, 55.5, 45

[56] References Cited
UNITED STATES PATENTS

| | | | |
|---|---|---|---|
| 3,440,326 | 4/1969 | Lair............................ | 174/15 BH X |
| 3,522,361 | 7/1970 | Kafka............................ | 174/15 C |
| 3,539,702 | 11/1970 | Edwards et al................. | 174/15 BH |
| 3,728,463 | 4/1973 | Kullman et al.................. | 174/19 X |
| 3,764,726 | 10/1973 | Kohler et al..................... | 174/15 BH |
| 3,792,220 | 2/1974 | Yoshioka et al................. | 174/DIG. 6 |
| 3,801,723 | 4/1974 | Kubo et al....................... | 174/15 BH |
| 3,835,239 | 9/1974 | Schmidt et al................... | 174/15 C |
| 3,849,589 | 11/1974 | Schmidt et al.................. | 174/DIG. 6 |
| 3,865,968 | 2/1975 | Heumann........................ | 174/15 BH |

Primary Examiner—Arthur T. Grimley
Attorney, Agent, or Firm—Kenyon & Kenyon Reilly Carr & Chapin

[57] ABSTRACT

In apparatus for supplying power to electrical devices having conductors cooled to a low temperature and in which the apparatus establishes connections between normal conductors at room temperature and the cooled conductors, with the end of the cooled conductors which are connected to the normal conductors located in the gas flow of an evaporated coolant, means are provided to supply an additional cold gas into the gas flow of the evaporated coolant at a temperature level which is above the evaporation temperature of the coolant thereby permitting the conducting cross-sectional areas of the normal conductors in the apparatus to be designed only for an average operating current and to thereby reduce coolant losses.

19 Claims, 2 Drawing Figures

APPARATUS FOR SUPPLYING POWER TO ELECTRICAL DEVICES HAVING CONDUCTORS COOLED TO A LOW TEMPERATURE

BACKGROUND OF THE INVENTION

This invention relates to apparatus for supplying power to electrical devices having conductors cooled to low temperatures in general and more particularly to an improved type of apparatus of this nature in which the normal conductors therein need not be overdesinged and coolant losses are reduced.

It is often necessary to supply power to electrical devices having conductors which are cooled to low temperatures from a power supply which is at a higher temperature such as room temperature. This is the case particularly with respect to devices utilizing superconductors such as superconducting cables, coils, or machines which contain superconductors which must be cooled to a temperature below the transition temperature of the superconductive material. Because a superconductor losses its superconductivity at a temperature far below room temperature, metal having a normal electrical conductivity can be used to bridge the temperature difference. Typical of such are aluminum and copper. Such a normal conductor will be connected to the superconductor at a point which is kept below the transition temperature of the superconductor. The normal conductor in turn can be cooled gradually or in steps from the room temperature to the low temperature at the junction point.

Stepwise cooling of this nature in an apparatus supplying power to cooled conductors is described in U.S. Pat. 3,764,726. In the disclosed apparatus several heat exchangers which are at fixed temperature levels are employed.

In addition to apparatus of this nature in which cooling takes place in cascade fashion, apparatus supplying power to cooled conductors can be of type continuous cooled by an exhaust gas. Such devices are frequently used because of better heat exchange conditions and their simpler design. In such an apparatus the superconductor end which must be kept below the transition temperature can be disclosed in a bath of cryogenic medium such as a liquid helium bath. In such a case the normal conductor can consist, at the junction point, of individual wires, lamanations or screens. An embodiment of this nature for supplying large currents is described in "The Review of Scientific Instrument," Vol. 38, No. 12, Dec. 1967, pages 1776 to 1779. The liquid helium in the bath is evaporated partially by the thermal losses of the current supply components. The helium rises along the conductor laminations, wires or conductor screen and dissipates joule heat along with the heat flowing in from the outside. As a result the helium gas heats up to approximately room temperature. To improve heat dissipation the helium bath can also be equipped with an additional heat source to establish higher evaporation rates. At the upper point of contact between the normal conductor in the current supply apparatus and external current supply line the helium gas is generally captured and then conducted to a refrigeration system where it is reliquified. Since the heat content of the gaseous coolant is well utilized in such current supply apparatus in which cooling by exhaust gas takes place, the cost for coolant requirements is relatively low.

The cross-sectional area of the normal conductor in such a current supply which is cooled by exhaust gas can be optimized for a certain nominal current. At this nominal current the liquid helium losses of the current supply are at a minimum and a continuous temperature gradient becomes established along the conductor from the hot end at room temperature to the cold end in the helium bath. it has been found in practice, however, that such ideal operating conditions cannot always be maintained. With only a light excess current the continuous temperature gradient along the conductor will be lost. Instead a steep temperature increase occurs at first, and only after a certain conductor length, which depends on the excess current, does the temperature gradient again decrease continuously toward the cold end of the conductor. As a result in the conductor section of increasing temperature the danger that the electrical insulation surrounding it can become damaged or that the conductor can melt exists. Because of this it is common practice to make the cross-sectional area of the conductor larger than would be required for a given nominal current as a safety measure. In addition to the overdesign of conductor with regard to its cross-section the undesired temperature increases in the conductor can be avoided by providing means to insure that additional quantities of the cooling gas are generated using a heating element in the helium bath. This, however, results in the temperature at the hot end of the conductor dropping so that the dielectric high voltage strength of the insulator is endangered by condensed water forming at this point. As a result an additional heating system may be required to avoid the formation of condensate at this point. The consequences of taking measures of this nature is that the quantity of liquid helium required goes beyond the optimum for such a current supply.

Furthermore an enlargement of the cross section results in an increased introduction of heat into the coolant bath so that the coolant losses will be greater even under no load operating conditions, i.e. even when no current is flowing through the conductor, the increased size thereof conducts more heat from the outside room temperature to the coolant bath.

In view of these difficulties it is the object of the present invention to provide an improved current supply apparatus of this nature in which the above noted problems are reduced or even eliminated.

SUMMARY OF THE INVENTION

The present invention solves these problems in a current supply apparatus of the type described above through the provision of means for supplying an additional cold gas which is fed into the gas flow of the evaporated coolant at a temperature level which is above the evaporation temperature of tghe coolant. Through these measures a number of particular advantages are obtained. The conductor cross-section in the current supply need only be designed for the average operating current. As a result conductor cross-sections which are smaller than those which have normally been previously used become possible. This in turn results in a limitation of the coolant losses resulting from heat conduction through these current carrying conductors from the outside room to the coolant bath. Furthermore since the relative thermodynamic efficiency of the refrigeration equipment required for cooling the current supply and the electrical devices associated with it improves with with increasing temperature, the cooling output required of such refrigeration is smaller due to the additional introduction of cold gas according to the present invention. This is true since the point of introduction has a higher temperature level than the evaporation temperature of the coolant.

When currents exceeding the nominal current occur, additional cold gas is fed in to dissipate the additional heat which is produced. In accordance with the embodiment disclosed, means are provided to control the amount of cold gas which supplied. As an example, a regulating valve which is coupled to circuits responsive to load fluctuations is placed in the cold gas inlet line to control the flow rate. In accordance with the disclosed embodiment a control signal is obtained from a temperature sensor which is disposed in the area of the conductor in which the greatest increase in temperature is expected.

DETAILED DESCRIPTION OF THE PREFERRED EMBODIMENT

Figure 1:
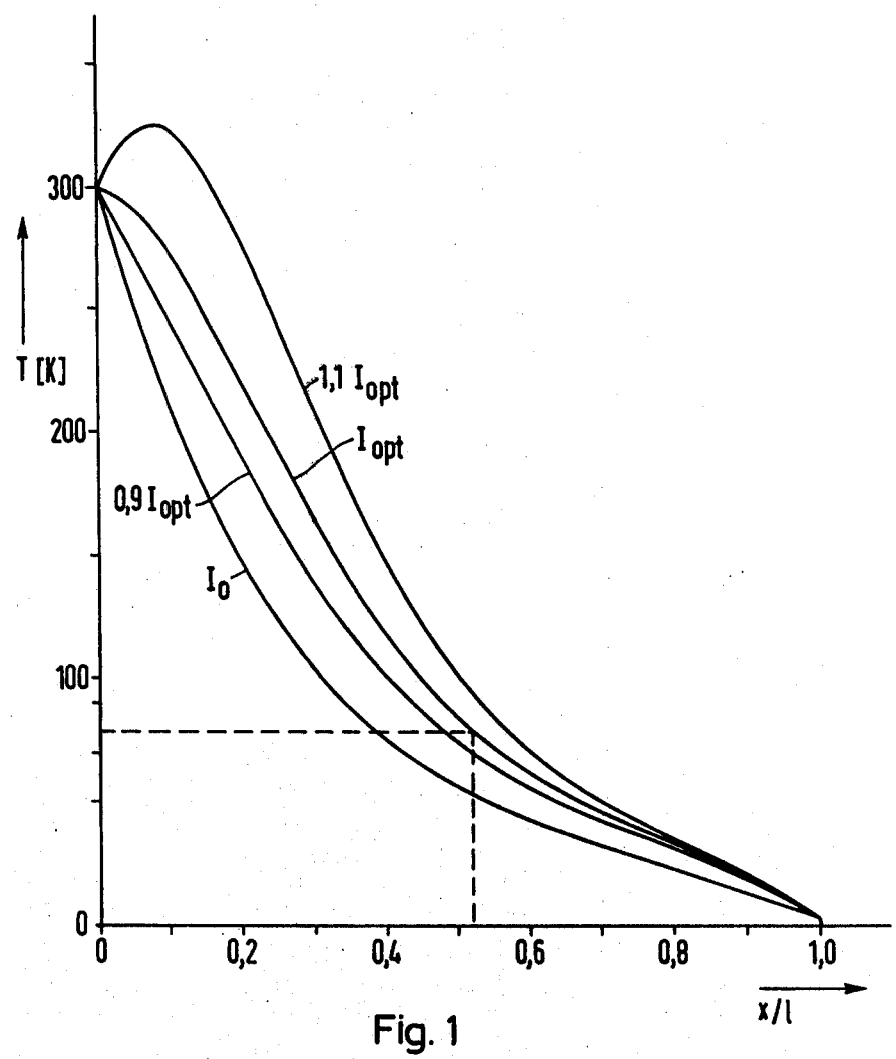
FIG. 1 is a diagram illustrating the temperature dependence of the conductors of an optimized current supply whhich is cooled by an exhaust gas not having the intermediate cold gas supply of the present invention as a function of the conductor coordinate.

FIG. 1 is a diagram helpful in understanding the problem solved by the present invention. On the graph the ordinate represents the conductor temperature T of the normal conductor in a current supply apparatus. The current supply is optimized for an operating current $I_{opt}$ i.e. it is designed to have minimum coolant losses for this current. The temperature gradient in K is measured along the conductors and which extend between a cooling bath for the electrical device such as superconducting cable which is connected to the current supply, and the external room temperature. On the abscissa of the graph the conductor parameter $x$ divided by 1 where the 1 is the conductor length and $x$ the conductor coordinate from the cooling bath in the direction of the hot end of the current supply is plotted. Four curves are illustrated for the optimized conductor. The lowest one, designated $I_0$ the temperature curve in a current supply which is operated without current. In this case, all heat is heat from outside the apparatus conducted through the normal conductor thermally. The next curve is designated $0.9\ I_{opt}$; this represents the corresponding temperature gradient for an operating current of 90% of the $I_{opt}$ current. This temperature will be a result of both the room temperature conduction and a temperature rise due to current flowing in the conductor. Similarly these two contributions effect the temperature gradient to be discussed in the next two curves. The next curve is labeled $I_{opt}$ and represents conductors carrying the optimum current. The final curve is for a conductor carrying a current which is approximately 110% of the optimum current. This current is designated $1.1\ I_{opt}$. As is evident from the shape of the curve, near the hot end there is a substantial temperature increase which then gradually tapers off. Because this greatly increased temperature can lead to damaged insulation or even to melting of the conductor itself, it is the present design practice in current supplies of this nature which are cooled by exhaust gases to design the apparatus so that temperature function at normal operating current corresponds approximately to that of the curve labeled $0.9\ I_{opt}$ or to a curve below it. Through such a design, if the current increases by 10%, it will then only reach the curve $I_{opt}$ and the bulge in temperature gradient will not be present. In carrying out such a design, however, the conductors of the current supply must be designed for higher currents than will occur in normal operations. Clearly this increases the overall losses in the coolant bath due to thermal conduction from outside the apparatus to the coolant bath.

Also in the figure are dashed lines which indicate an example of the manner in which a position and/or temperature for an additional cold gas can be selected. The example given indicates a conductor parameter $x/1 = 0.51$, i.e., a position at about the middle of the conductor length. At this position the temperature is approximately 80K. As a result a supply of cold gas at this temperature can be supplied at approximately the center of the current supply conductor since at that point it will advantageously have the same temperature as the exhaust gas which is constantly cooling the conductor.

Figure 2:
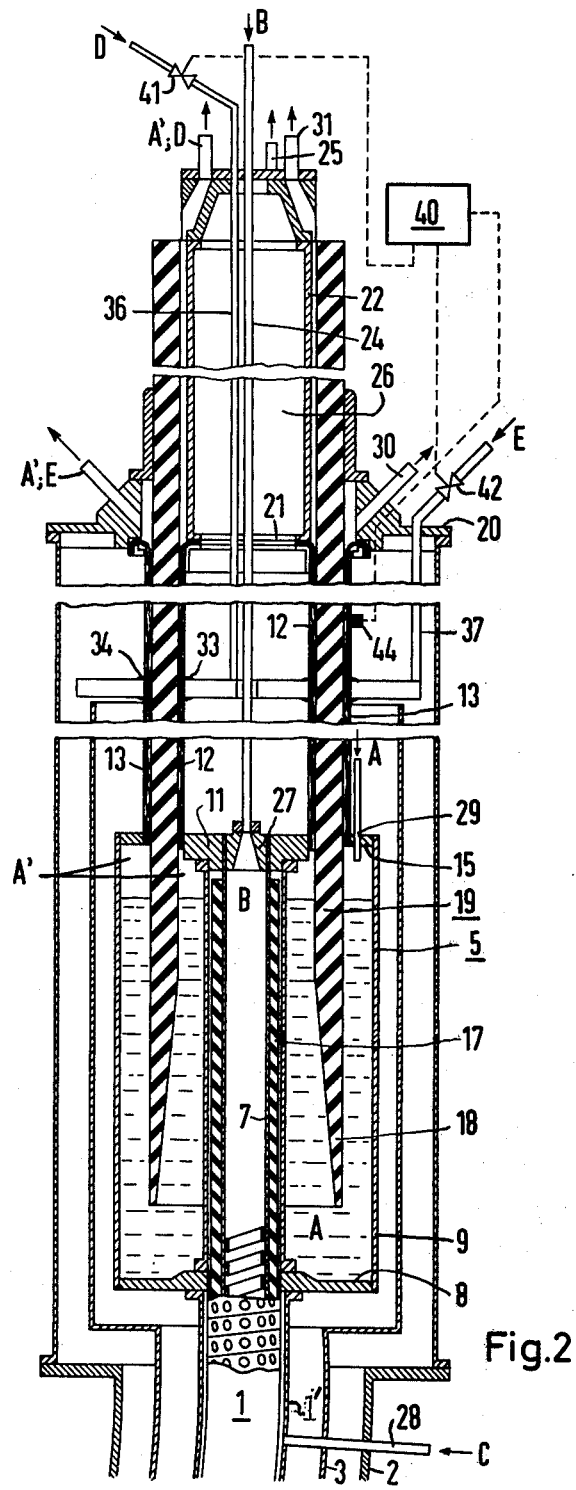
FIG. 2 is a view partially in cross-section of a current supply having the intermediate cold gas supply of the present invention.

FIG. 2 illustrates in cross section an apparatus employing the additional cooling supply of the present invention. At the bottom of the figure a superconducting coaxial conductor 1 which can be the conductor for one phase of a three phase system is shown. The conductor will include coaxial inner and outer conductors separated by appropriate insulation. In the figure only the outer conductor 1' of the superconducting conductor 1 is shown in detail. The conductor is supported within a vaccum tight hollow tube 2 concentric with the conductor. Between the coaxial conductor 1 and the outer hollow tube 2 is a radiation shield 3, also concentric. Typically the conductors of the superconductor will comprise a plurality of individual superconducting wires and will be pervious to coolants. Atop the upper end of the conductor 1 is a coolant tank 5. As illustrated, the inner conductor 7 and insulation 17 of the superconductor extend through a suitable openning in the bottom of the tank 5 and into the tank. The bottom 8 and outside walls 9 of the coolant tank 5 are of an electrically conducting material such as copper of aluminum and are used for supplying current to the outer conductor 1' of the superconducting conductor 1. Typically the superconductor is designed for high voltages of 110 $kv_{eff}$ and for currents of $10^4$A. The inner conductor will be at high voltage potential and the outer conductor at a ground potential. Attached to the uppermost end of the end portion 7 of the inner conductor in a conducting manner is a disc-shaped contact plate 11. The outside circumference of the contact plate 11 has connected to it in an electrically conducting manner the lower end of a tubular inner normal conductor 12 which may comprise, for example, a multiplicity of thin single copper or aluminum wires. Concentrically disposed around the inner normal conductor 12 is an outer normal conductor 13 of similar design. The two are insulated from each other with a predetermined spacing. The lower end of the tubular outer normal conductor 13 is fastened in an electrically conducting manner to the inside of an annular plate 15 concentric with the contact plate 11. The contact plate 15 in turn is connected in an electrically conducting manner to the sides 9 of the coolant tank 5. The contact plates 11 and 15 will be of similar design with the contact plate 15 encircling the the contact plate 11 in a ring-like fashion. Through the disclosed arrangement, the conductors of the superconductor 1 will receive current from the normal conductors 12 and 13 through the contact plates 11 and 15. The components 11 and 12 are at high voltage potential while the components 8, 9, 13 and 15 surrounding them are at ground potential. The contact plates 11 and 15 are the cold end of the normal conductors i.e. it is at this point that the junction between the normal conductors and the superconducting conductors takes place. In addition, these plates form the cover for coolant tank 5. The coolant tank itself is essentially the space between the outer cylindrical wall 9 and and inner tubular wall formed by an insulator 17 enclosing the end piece 7 of the inner conductor. This insulating member 17 is coupled in a gas-tight manner to the contact plate 11 and bottom 8. The outside wall 9 is connected to the contact plate 15 in a gas-tight manner.

Freely projecting into the coolant tank 5 is the lower end 18 of a hollow cylindrical insulator 19. The insulator 19 extends over essentially the full length of the apparatus starting at the upper part of the current supply and extending between the inner and outer normal conductors 12 and 13 and between the two contact plates 11 and 15. It is arranged such that exhaust gases A' from the coolant A which is contained in the tank 5 will rise along its two sides and thereby be conducted along the normal conductors 12 and 13. Current and voltage are supplied to the inner and outer conductors of the superconducting conductor 1 from apparatus at room temperature through the normal conductors 12 and 13 to the point of low temperature. It is advantageous if the current density in the normal conductors 12 and 13 be maintained constant over their cross section area and length. Because of their large area a good heat exchange with the exhaust gas A' rising from the tank 5 occurs to cool these conductors. Under optimum operating conditions, the hot end of these conductors 12 and 13 which is found at the members 20 and 21 will be at room temperature. Because of this the concentrically disposed normal conductors will preferably be of the same length to avoid a heat exchange across the insulator 19 disposed between them. Otherwise an interference with optimum operating conditions would result. This design also prevents mechanical stresses in the radial direction in the insulator 19. In addition, to insure that the hot end 21 of the normal conductor 12 is maintained at room temperature, a hollow copper cylinder 22 is provided having a cross-sectional area which is large relative to the cross-sectional are of the normal conductor. Furthermore an oil circulation system, not shown on the figure, can be provided at the hot end of the normal conductors 12 and 13 to insure that they are maintained at room temperature even when operating conditions are not optimum. Note also that the member 20 at which the outer normal conductor terminates is also of a fairly large cross-sectional area to insure proper temperature conditions.

The current supply apparatus also contains a coolant inlet and outlet for supplying coolant either to the entire cable or a portion thereof. Where the conductor 1 is a superconductor, as a practical matter, the only coolant which will be used is helium. Thus, in addition to the boiling helium A which fills the tank 5 and is used to absorb the heat losses in the current supply, single phase helium B and C in a closed circulation system under pressure is used for the removal of heat losses from the inner and outer conductors of the cable 1 respectively. For example, single phase helium is supplied to the inner conductor, already at a high voltage potential in a known manner, by means of a hollow tube 24 centrally disposed in the inner chamber 26 of the current supply apparatus. It is evacuated through a nipple 25. To accomplish this a heliumtight coupling through the center of the contact plate 11 is provided. To supply helium C at a ground potential for cooling the outer conductor, a separate tubular line 28 is provided lateral to the conductor 1 in the vicinity of the junction point between the current supply apparatus and the conductor. The boiling helium A in the tank 5 may also be supplied at ground potential to the tank 5 through a coupling 29 in the outer contact plate 15. The voltage transition from ground to high voltage potential in the helium bath will take place uniformly over an appropriately long distance at the lower end 18 of the immersed high voltage insulator which will preferably be provided with a potential control for this purpose. After the evaporated helium flows past the normal conductors 12 and 13 to act as a cooling gas, this helium gas A' escapes from the apparatus through a discharge opening 30 on the outside at ground potential and through discharge 31 on the inside which is at high voltage potential. The discharged helium may then be collected and liquified using appropriate refrigeration apparatus.

The conducting cross sectional areas Q of the two normal conductors 12 and 13 of the current supply apparatus can be optimized for a predetermined operating current $I_{opt}$. That is to say they can be selected so that the heat introduced the helium A in the tank 5 at the current $I_{opt}$ is a minimum. Depending the purity of the normal conductor material, the ratio of coolant losses at a operating current $I_{opt}$ to losses at no-load current $I_0 = 0$ will then range approximately between 1.3 and 2.6 in such an arrangement which is cooled by the exhaust. However, it may be expedient under certain circumstances, in particular under operating conditions which involve prolonged periods of operation at no-load, to increase this ratio for economic reasons even if higher momentary operating losses are experienced than would be in an optimized current supply. In general, the cross-sectional areas Q are chosen so that the losses of evaporated helium A' averaged with respect to time are at a minimum.

If nothing further were done this design to optimize the current supply could involve the danger of excessive temperatures occurring in the vicinity of the end of the normal conductors which could lead to their damage or destruction or to damage or destruction of the insulator 19, However, in accordance with the present invention a separate cold gas feed is provided for the current supply apparatus. This additional gas supply designated D and E can be, for example, helium gas at 80K. As illustrated on the drawing it can be supplied to the normal conductors 12 and 13 respectively from the input connections 33 and 34. These are advantageously located at the point where the temperature level of the cold gas coincides with that of the exhaust gas A' which is streaming from the tank 5 during the normal operation of the current supply i.e. during operation at a current $I_{opt}$. Thus, the cold gas D which will be at high potential is conducted through a supply line 36 extending through the inner chamber 26 to a feeding point 33 where it is admixed to the rising exhaust gas from the tank 5 alongside the normal conductor 12. In similar fashion the cold gas E at ground potential is supplied to a feeding point 34 through a supply line 37 and is combined there with exhaust for cooling the normal conductor 13. The cold gas D and E leaves the current supply apparatus along with the respective exhaust gases through the outlet points 31 and 30 respectively.

It is advantageous if the quantity of cold gas D and E supplied is determined in accordance with the amount of excess current over the current $I_{opt}$. For this purpose a control 40 is provided which has outputs controlling valves 41 and 42 in the inlet lines for the respective gases. The control variable input to the control 40 can be the current through the normal conductors 12 or 13 or their resistence. However, in the illustrated embodiment, the control input is obtained from a temperature sensor. Although a single temperature sensor is illustrated it will be recognized that additional temperature sensors may be used to develop this input. The temperature sensor is located at one of the normal conductors and will measure temperature increase at that point in the case of an excess current. In the illustrated embodiment a temperature sensor 44 is mounted to the outer normal conductor 13 at a point where excessive temperature could develop. Placing the temperature sensor at this point allows it to be at ground potential and it can be used effectively at this point rather than on the high voltage side. As illustrated by the dotted lines, an output from the temperature sensor 44 provides a control input into the control 40 which in response thereto controls the position of the valves 41 and 42 and thus the quantities of cold gas supplied. The temperature sensor may be a carbon or germanium resistor for example connected in conventional fashion into a measuring circuit such as a bridge or the like.

In addition to supplying a cold gas in the form of gaseous helium as the gases D and E i.e. instead of supplying the same coolant as that in tank 5, a different coolant may also be used as the cold gas. For example, an electronegative gas or an electronegative vapor or an organical radical or its inorganic analog may be added to the exhaust gas A' from tank 5. See for example U.S. Pat. No. 3,835,239. Through such measures an increased breakdown voltage in the current supply will be obtained at the same time. Examples of such gases are sulfur hexafluoride $SF_6$, oxygen $O_2$ or nitrogen dioxide $NO_2$.

When using helium gas near room temperature, which gas has a particularly low dielectric strength, there are two known methods available for bridging the high voltage gradients. First, the dielectric strength of the gaseous helium can be increased through the admixture of an electronegative gas as indicated above. Second, the gaseous helium can be discharged in capillaries of an electrically insulating material. Such is disclosed in U.S. Pat. No. 3,849,589.

The ratio of helium losses at an operating current I to the losses at no load current $I_0$ can be increased in a simple manner through the additional gas cooling. It is clear that the refrigeration capacity required to cool the current supply will decrease if an increased temperature can be tolerated at the points where the additional coolant is fed in. It is evident from FIG. 1 that in the lower portion of the apparatus, even with higher current, there is no problem with increased temperatures. It is only near the hhot end as shown for 1.1 $I_{opt}$ that the problem occurs. For a system without the additional cooling a relationship exists for an optimized condition in which $I \times l/Q = C$ where $I$ is the current, $l$ the length, $Q$ the cross sectional area of the current supply and $C$ a constant. The constant will depend on the material used and to a small extent on the hot end temperature of the current supply. What this relationship means is that in designing for a current I a certain size Q of conductor cross-section and length must be selected to obtain and desired optimal relationship, i.e. the desired constant. As indicated by FIG. 1, the point at which the additional coolant is supplied is approximately in the middle of the current supply arrangement. On FIG. 2 the supply points for the additional coolant are at 33 and 34. In the ideal case, the temperature of the current supply can be kept constant at these points. Cooling from these points to the hot end of the current supply apparatus can be accomplished through the use of the additional cooling gas, supplied at approximately 80K. What this means is that in the relationship given above the operative factor becomes not the length $l$, but the position $x$ of the supply points 33 and 34. As indicated this is approximately one half of the length $l$. Consequently the desired relationship can be obtained with a current approximately equal to 2I. In other words the factor $l$ is cut in half allowing the current I to be doubled. Thus, for the same conductor cross-section essentially twice the amount of current can be carried with the arrangement of the present invention. In other words, the normal conductors 12 and 13 can be loaded with a larger current I between the cold end in the tank 5 and the supply point 33 and 34 without this section becoming thermally unstable under a given set of conditions in the equation above. Thus, a system in accordance with the prior art designed for current I can, with the additional cold gas of the present invention be opeerated with a current of approximately 2 I with no increase in the no-load losses. This follows directly from the fact that the no-load losses are primarily a function of the conductor cross-section which, as indicated, need not be increased to carry this increased current. Conversely, for a device which must carry the same current the cross-section can be cut in half thereby substantially decreasing the no load losses. Under load conditions the coolant from the tank 5 insures that the lower portion of the conductors are maintained cool i.e. the portion between the tank 5 and the supply points of the additional coolant. The additional coolant insures that the temperature profile in the upper of the current supply between the supply points 33 and 34 and the hot end at room temperature is maintained stable.

Even though considerable current variations due to load fluctuations can occur in a cable of this nature, the supplemental gas cooling of the present invention permits the current supply for the superconducting cable to be optimally adapted to the prevailing operating conditions. This increases operating safety substantially and permits a substantial reduction in the refrigeration output required since the cooling requirement for the current supply apparatus represents a substantial share of the total cooling requirements of the superconducting cable A substantial reduction in this area means a substantial overall reduction.

The present invention has be described in connection with a current supply apparatus for a superconducting cable which is helium cooled. However, the present invention may also be applied to other types of conductors which are cooled to low temperatures such as aluminum or beryllium conductors. Typically, such are cooled by other coolants such as hydrogen with the present invention being equally applicable to such coolants.

In addition, although the present invention has been disclosed in connection with particular type of current supply apparatus for electrical devices, other types of apparatus utilizing exhaust gas cooled current supplies may also be constructed in accordance with the present invention. For example, apparatus equipped with special devices which create a potential transition zone for the coolant D of the inner phase conductor within the current supply apparatus to thereby at least partially eliminate the need for high voltage transition elements in the coolant discharge lines may be employed. These and other modifications may be made without departing from the spirit of the invention which is intended to be limited solely by the appended claims.

We claim:

1. A current supply apparatus for electrical devices having conductors cooled to a low temperature of the type in which the end of a cooled conductor is connected to one end of a conductor having its other end at a higher temperature, said conductor having its other end at a higher temperature being at least partially disposed in the gas flow of an evaporated coolant, wherein the improvement comprises means to supply a supplemental cold gas into the gas flow of the evaporated coolant at a temperature level above the evaporation temperature of the coolant.

2. Apparatus according to claim 1 wherein the point of feeding said supplemental cold gas is at a point where the temperature of the cold gas approximately equals the temperature of the evaporated coolant.

3. Apparatus according to claim 2 and further including means to control the quantity of said supplemental cold gas which is supplied.

4. Apparatus as in claim 3 wherein said means to control the quantity comprise at least one controllable valve in the supply line for said supplemental cold gas and means to control said valve.

5. Apparatus according to claim 4 wherein said control means include a controller and temperature sensing means providing an actual value input to said controller, said temperature sensor being disposed in the gas flow of the evaporated coolant.

6. Apparatus according to claim 5 wherein said temperature sensor is mounted in an area which would be subject to an excessive temperature beyond the normal outside temperature of the current supply should said supplemental cold gas not be supplied and the apparatus be subjected to an excess current over the optimum current for which it is designed.

7. Apparatus according to claim 6 wherein said temperature sensor is mounted at the point where the maximum temperature is expected.

8. Apparatus according to claim 7 wherein said temperature sensor comprises a carbon or germanium resistor.

9. Apparatus according to claim 1 wherein said cooled conductors are superconductors and wherein said conductor having its other end at a higher temperature is a normal conductor.

10. A method of providing improved efficiency in a current supply apparatus for electrical devices having conductors cooled to low temperatures of the type in which the end of the cooled conductor is connected to a normal conductor which is located in the gas flow of an evaporated cooler comprising the step of feeding a supplemental supply of cold gas into the gas flow of the evaporated coolant at a temperature level which is above the evaporation temperature of the coolant.

11. The method according to claim 10 wherein said supplemental supply of cold gas is provided at a point in the gas flow where its temperature is approximately equal to the temperature of the evaporated coolant.

12. The method according to claim 11 and further including the step of selecting tthe temperature at which said supplemental cold gas is supplied as the temperature which would result in a normal conductor having a cross sectional area optimized without supplying the supplemental cold gas for a nominal current for minimum coolant losses at the point where the feeding of the supplemental cold gas is to take place.

13. The method to claim 9 wherein said cold gas is the same cryogenic media as the evaporated coolant.

14. The method according to claim 13 wherein said cold gas is an electronegative gas.

15. The method according to claim 13 wherein said cold gas is helium.

16. The method according to claim 10 and further including the step of controlling the quantity of cold gas supplied.

17. The method according to claim 16 wherein said control of quantity is done as a function of the sensed temperature in the gas flow is evaporated coolant.

18. The method according to claim 17 wherein the temperature is sensed at a point where without supplying said supplemental cold gas an excessive temperature beyond normal outside temperature is anticipated in the case of an excess current above the optimum current.

19. The method according to claim 18 wherein said temperature is sensed at the point where the maximum temperature of the normal conductor is expected.

* * * * *

UNITED STATES PATENT OFFICE
CERTIFICATE OF CORRECTION

Patent No. 3,959,576　　　　　　　　　　Dated　May 25, 1976

Inventor(s)　Peter Penczynski et al.

It is certified that error appears in the above-identified patent and that said Letters Patent are hereby corrected as shown below:

Column 1, line 45, "disclosed" should read -- disposed --.

Column 2, line 8, "it" should read -- It --.

Column 2, line 10, "light" should read -- slight --.

Column 2, line 55, "tghe" should read -- the --.

Column 3, line 47, between "I$_o$" and "the" insert -- is --.

Column 4, line 44, "of" second occurrence should read -- or --.

Column 4, line 48, "kv$_{eff}$" should read -- kV$_{eff}$--.

Column 6, line 53, "," should read -- . --.

Column 7, line 65, "hhot" should read -- hot --.

Column 8, line 7, "and" should read -- the --.

Column 8, line 59, "of" second occurrence should read -- for --.

Column 8, line 60, after "cable" insert -- . --.

Column 10, line 25, "tthe" should read -- the --.

Signed and Sealed this

Second Day of November 1976

[SEAL]

Attest:

RUTH C. MASON
*Attesting Officer*

C. MARSHALL DANN
*Commissioner of Patents and Trademarks*